United States Patent Office 2,905,459
Patented Sept. 22, 1959

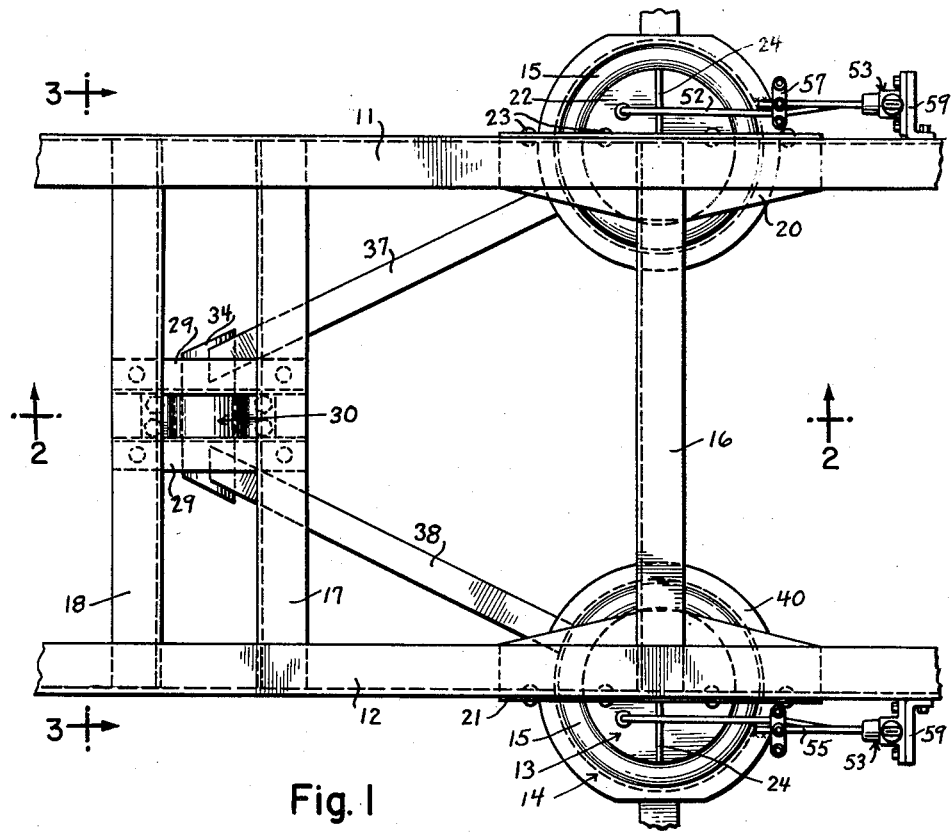
Fig. 1
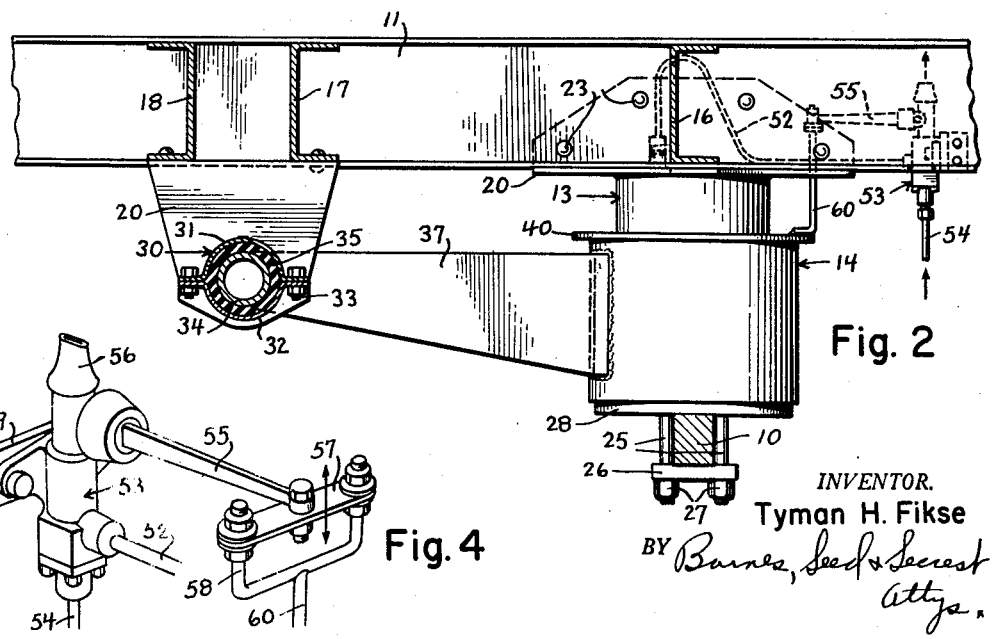
Fig. 2
Fig. 4
INVENTOR.
Tyman H. Fikse

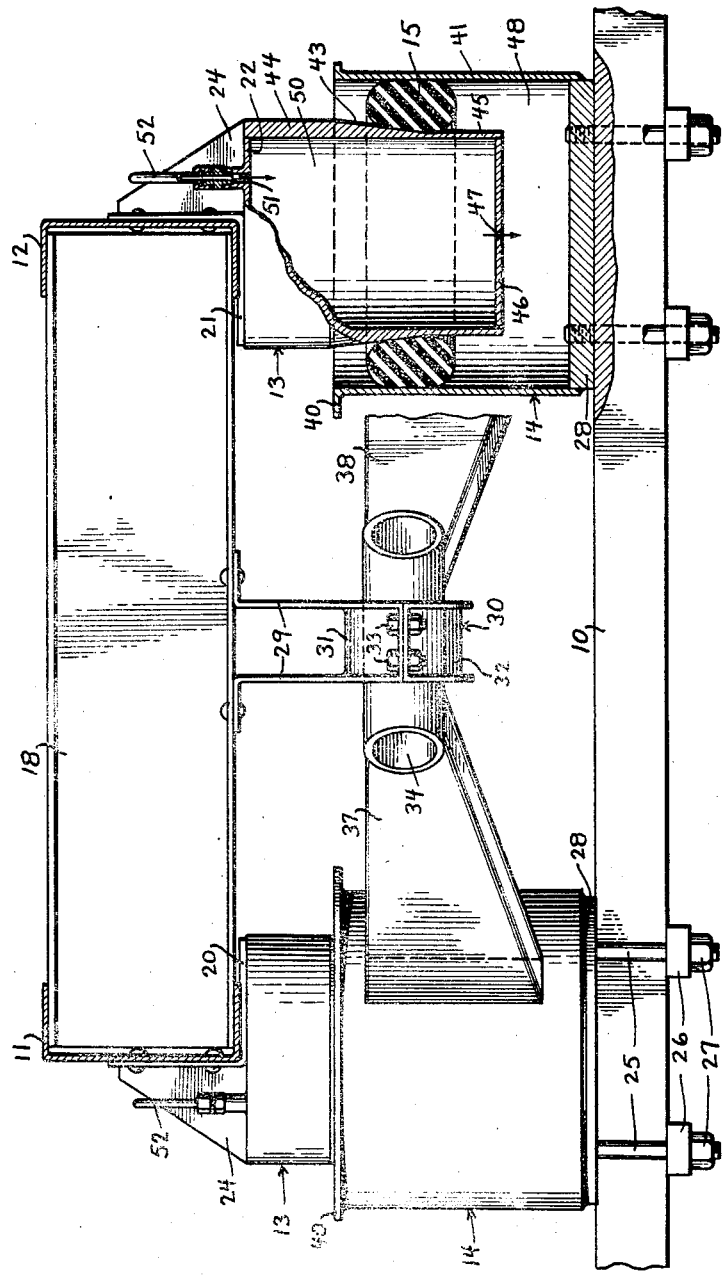

2,905,459

SUSPENSION SYSTEM FOR AUTOMOTIVE VEHICLES

Tyman H. Fikse, Seattle, Wash.

Application May 9, 1955, Serial No. 507,109

7 Claims. (Cl. 267—15)

The present invention relates generally to the primary axle supporting springs for vehicles and more particularly to springs of the so-called air type heretofore designed primarily for trucks and trailers which are subjected to heavy vertical and transverse loads, although the invention is applicable to automotive and other uses as well.

In the past there have been attempts to use modified air cylinder units as springs with the piston and cylinder being connected, one to the vehicle frame, and the other to the axle. To applicant's knowledge these have not met with commercial success for many reasons including sensitivity and leakage problems and the inability to absorb loads acting lengthwise of the axle. Inflated tire-like spring units have been used commercially between the axle and frame assemblies but these have presented problems in controlling lateral sway of the vehicle since such a spring unit tends to permit excessive sidewise movement of the vehicle frame relative to the axle assemblies.

This invention aims to provide an effective spring assembly for vehicles which will utilize the cushioning effect of a suitable compressed fluid for vertical loads and at the same time absorb loads transverse of the vehicle without permitting sidewise movement of the vehicle relative to its axles to become excessive.

A further object of the invention is to provide such a spring assembly which will not be unduly sensitive and which will be effectively sealed against leakage of the compressed fluid utilized.

As another object the invention aims to provide control which will maintain a predetermined spacing between the frame and axle of the vehicle with changes of static load on the latter.

The invention further aims to provide such a spring assembly which will be easy to install and maintain and which has a minimum of parts.

Yet another object is to provide such a spring which will have spring characteristics even if the supply of compressed fluid thereto is cut off.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a top plan view of my invention installed on a vehicle shown fragmentarily.

Fig. 2 is a longitudinal vertical sectional view taken along line 2—2 of Fig. 1.

Fig. 3 is a transverse vertical sectional view taken along the line 3—3 of Fig. 1 and with part of the left spring unit broken away to show the inside workings thereof; and Fig. 4 is a perspective view of one of the control valve assemblies as viewed when looking toward the rear of the vehicle.

For purposes of example, in the drawings I have illustrated a pair of my spring assemblies supporting an axle 10 beneath a frame having right and left longitudinal frame rails 11, 12. Each spring has an inner can 13 rigidly suspended from the frame and telescopically associated with an outer can 14 clamped onto the axle. These cans 13, 14 are spaced apart radially speaking and wedged between their telescoping portions is an elastic ring 15.

The frame rails 11, 12 are channels arranged with their flanges horizontal and directed inwardly of the vehicle. Extending therebetween is a channel cross-member 16 located directly above the axle 10 and a pair of cross-members 17, 18 positioned forwardly thereof. To make the rigid suspension of the inner cans 13 from the frame I provide a pair of angle brackets 20, 21 which are welded to top plates 22 of the inner cans and riveted at 23 to nest with the frame rails. Supplementing the weld connection between the angle brackets and the top plates of the inner cans are vertical reinforcing webs 24 each welded along a vertical edge to the respective angle bracket and along an outwardly extending lower edge to the top plate 22 of the underlying inner can. Each of the outer cans 14 is clamped to the axle 10 by a pair of U-clamps each comprising a pair of studs 25 straddling the axle and threaded into the base plate 28 of the related outer can, and a cross-plate 26 fitting over the free ends of the studs and forced against the underside of the axle by nuts 27.

Drawing attention to the front pair of cross-members 17, 18, it will be noted that they support a pair of angle bearing brackets 29 which are suspended therefrom by rivet connections and support a bearing 30 for a trunnion 34. The upper casing half 31 of this bearing is welded between the bearing brackets and bolts 33 hold the mating lower casing half 32 in position. Clamped between the casing halves of the bearing and the trunnion 34 is a rubber bushing 35. The ends of the trunnion project beyond the bearing 31 and are welded to a pair of diagonal struts 37, 38. These struts diverge rearwardly from the bearing to make rigid weld connections at their rear ends with the outer cans 14 such that the longitudinal axes of the braces are alined with the vertical axes of the cans.

Returning to the springs proper, and directing attention particularly to Fig. 3, it will be noted that the main body 41 of each of the outer cans 14 is cylindrical and is open at the top to receive an inner can 13. It may have an upper rim flange 40 for strength purposes and is closed at its lower end by an air-tight connection with its base plate 28. Each of the inner cans 13, on the other hand, has its main body externally modified from a cylindrical configuration by having a frustroconical central external surface 43 which tapers inwardly as it descends from an enlarged upper main body portion 44 to a reduced lower main body portion 45. The elastic ring 15 is seated between this tapered portion 43 and the outer can and one of its functions is to seal off a pressure chamber 48 therebelow. It will be noted that the lower as well as the upper end of each inner can is closed, a bottom plate 46 being provided. This plate is formed with a dampening orifice 47 interconnecting the interior 50 of the inner can, which may be considered as a surge chamber, with the otherwise closed pressure chamber 48. Fluid under pressure is supplied to the surge chamber 50 through an opening 51 in the top plate 22. This opening is equipped with a suitable fitting to which is connected a tube 52 communicating with a two-way slide control valve 53 which is mounted by a bracket 59 to the outside face of a respective frame rail 11, 12. Directing attention to Fig. 4, the bore of this valve 53 is connected at its lower end with a supply line 54 leading from a source of compressed fluid which will normally be compressed air from the vehicle's air brake system. The valve has a forwardly extending control arm 55 for positioning the slide valve between two positions, a fill position causing the tube 52 from the surge chamber to receive fluid from the supply line, and a dump position blocking off the supply line and causing the tube 52 to vent through a discharge fitting 56 to the atmosphere. At its forward end the control arm 55 has a bolt connection with a fiber piece 57 bridging the forks 58 at the head of an upright forked rod 60 which is rigidly connected at its lower end to the rim flange 40. When the control arm 55 is caused to pivot upwardly from its horizontal neutral position in response to downward movement of the vehicle frame relative to the axle 10 the valve reaches its fill position causing the pressure in the surge and pressure chambers to be increased. Conversely, when the control arm 55 pivots downwardly responsive to upward movement of the vehicle frame relative to the axle the valve assumes its dump position causing a lowering of pressure in the surge and pressure chambers. In this manner the spacing of the axle below the vehicle frame when the vehicle is at rest can be maintained at a predetermined constant value independent of the static load on the vehicle.

The action of the elastic ring 15 will now be explained in detail. As shown in Fig. 3, the ring is always seated between the tapered portion 43 of the inner can and the cylindrical wall of the outer can and the load of the vehicle frame on the inner can of course causes a deformation of the ring as it is squeezed between the two cans. In this regard the ring can be originally formed with an elliptical cross-section, instead of a circular one, having its major axis in the plane of the ring so that when the ring is forced between the cans its major and minor axes will approximate one another. When the vehicle wheels strike a raised irregularity in the roadbed the effect is for the inner and outer cans to attempt to telescope further together. Such movement is yieldingly resisted by the compressed fluid in the pressure chamber and by the ring 15. It is of utmost importance to understand that as the cans so telescope further together, or on the other hand, further apart, the ring does not slide, but turns about its centroidal axis. By the term centroidal axis is meant the circle which is the locus of the centroids of all radial cross-sectional increments of the ring that can be taken at any particular instant of time. It will therefore be apparent that the centroidal axis varies along with the amount of deformation of the ring. To elaborate, in the instance wherein the inner and outer cans are telescoping further together, the portions of the ring above the plane of its centroidal axis will turn toward the center of the ring whereas those portions below such plane will turn away from the center of the ring. Likewise, when the inner and outer cans move further apart to assume their neutral position or because of a depression in the roadbed, the ring will turn about its centroidal axis in the opposite manner, that is, the portions of the ring above the plane of its centroidal axis will turn away from the center of the ring and those portions below such plane will turn toward the center of the ring. It thus becomes apparent that the elastic ring 15 helps to absorb part of the vertical load, and in fact, should the supply of compressed fluid for the pressure chamber be cut off, the ring 15 can assume the entire load.

Of equal, if not greater importance, is the fact that the ring 15 can absorb loads which tend to move the vehicle frame laterally. Imagine that the vehicle shown fragmentarily in the drawings were making a right turn around a steeply banked curve. This would cause the vehicle frame to lean and shift to the right with respect to the wheels and axle, and hence the inner cans 13 would be forced to the right with respect to the outer cans 14. Yieldingly resisting this force would be the right-hand half of each ring 15 as viewed in Fig. 3. These right-hand halves would of course be compressed by this lateral load but the seal of the pressure chamber would not be broken since the left-hand halves of the rings would responsively expand to fill the increased gap between the inner and outer cans occurring on the left-hand side thereof.

The struts 37, 38 are provided to resist the load on the spring units which results when the wheels of the vehicle are braked. It is desirable for a smooth ride that the spring units on opposite ends of an axle be able to function independently, and it is for this reason that the rubber bushing 35 is provided. This bushing permits enough endwise tilting of the trunnion 34 relative to the casing of the bearing 30 to permit the outer cans 14 to move vertically relative to one another a sufficient distance to assure substantially independent spring action.

The advantages of the invention, it is thought, will have been clearly understood for the foregoing detailed description of the illustrated preferred embodiment. Minor changes will suggest themselves and may be resorted to without departing from the spirit of the invention.

What I claim is:

1. In a vehicle, an axle assembly, a vehicle frame assembly carried by said axle assembly for vertical movement relative thereto, upstanding inner and outer members telescopically associated with one another through part of their length and providing opposed spaced generated surfaces which converge toward the telescoping end of said outer member, said members being rigidly mounted one on said frame assembly and the other on said axle assembly, an elastic ring radially compressed between said generated surfaces and adapted to turn in response to relative endwise movements of said members in a direction tending to increase the telescoping thereof, said ring and said members collectively defining a pressure chamber which tends to decrease in volume as the telescoping of said members is increased, and a supply of pressurized fluid to said chamber, said ring being arranged and adapted to further radially compress on one lateral side and radially expand on the opposite lateral side responsive to respective lateral thrust on one of said assemblies relative to the other whereby the resulting relative lateral movement is restricted by the ring while the latter constantly seals off said pressure chamber and sustains axial load.

2. In a vehicle, an axle assembly, a vehicle frame assembly carried by said axle assembly for vertical movement relative thereto, inner and outer members telescopically associated with one another through part of the length of the outer member and providing opposed concentrically spaced generated surfaces which converge toward the telescoping end of said outer member, said members being rigidly mounted one depending from said frame assembly and the other projecting upwardly from said axle assembly, an elastic ring squeezed between said generated surfaces and adapted to turn about its centroidal axis in response to vertical movements of said frame assembly relative to the axle assembly, said ring and said members collectively defining a pressure chamber which tends to decrease in volume as the telescoping of said members is increased, and a supply of pressurized fluid to said chamber, said ring being arranged and adapted to further radially compress on one lateral side and radially expand on the opposite lateral side responsive to respective lateral thrust on one of said assemblies relative to the other whereby the resulting relative lateral movement is restricted by the ring while the latter constantly seals off said pressure chamber and sustains axial load.

3. In a vehicle, an axle assembly, a vehicle frame assembly carried by said axle assembly for vertical movement from a predetermined normal level with respect thereto, inner and outer members telescopically associated with one another through part of the length of the outer member and providing spaced opposed concentric surfaces which converge toward the telescoping end of said outer member, one of said members extending downwardly from said frame assembly from a rigid connection therewith and the other of said members extending upwardly from said axle assembly from a rigid connection therewith, an elastic ring squeezed between said concentric surfaces and adapted to turn in response to movements of said frame assembly below said predetermined level, said ring and said members collectively defining a pressure chamber which decreases in volume as said frame assembly moves downwardly relative to said axle assembly, compressed fluid within said pressure chamber, and leveling means operatively associated with said frame and axle assemblies and responsive to a displacement of said frame assembly from said normal level for charging said pressure chamber with pressurized fluid when said frame assembly is below said normal level and for venting said pressure chamber when said frame assembly is above said normal level, said ring being arranged and adapted to further radially compress on one lateral side and radially expand on the opposite lateral side responsive to respective lateral thrust on one of said assemblies relative to the other whereby the resulting relative lateral movement is restricted by the ring while the latter constantly seals off said pressure chamber and sustains axial load.

4. In a vehicle, a frame assembly and an axle assembly movable with respect to one another, a pair of spring units spaced apart crosswise of said frame assembly and each having inner and outer members telescopically associated with one another and radially spaced apart, said inner members being rigidly mounted on one of said assemblies and said outer members being rigidly mounted on the other of said assemblies, an elastic ring compressed throughout its entire circumference between part only of the telescoped portions of the inner and outer members of each spring unit, and a pair of laterally spaced struts extending generally lengthwise with respect to said frame assembly, said struts each being pivotally connected at one of its ends to one of said assemblies by a common elastic journal and being operatively connected at its other end to the other of said assemblies, said rings being arranged and adapted to further radially compress on either lateral side and radially expand on the opposite lateral side responsive to respective lateral thrust on one of said assemblies relative to the other whereby resulting lateral relative movement is restricted by the rings while the latter at the same time are constantly in contact throughout their entire circumference with said inner and outer members.

5. In a vehicle, an axle assembly, a vehicle frame assembly carried by said axle for relative movement, a pair of spring units spaced apart crosswise of said frame assembly and each having inner and outer members telescopically associated with one another and providing opposed spaced generated surfaces which converge, said inner members being rigidly mounted on one of said assemblies and said outer members being rigidly mounted on the other of said assemblies, an elastic ring radially and axially compressed throughout its entire circumference between said opposed surfaces of each spring unit and together with the inner and outer members of said unit defining a respective pressure chamber which tends to decrease in volume as the telescoping of such members is increased, compressed fluid within said pressure chambers, and a pair of laterally spaced struts extending generally lengthwise with respect to said frame assembly, said struts each being pivotally connected at one of its ends to one of said assemblies by a common elastic journal and being operatively connected at its other end to the other of said assemblies, said ring being arranged and adapted to further radially compress on one lateral side and radially expand on the opposite lateral side responsive to respective lateral thrust on one of said assemblies relative to the other whereby the resulting relative lateral movement is restricted by the ring while the latter constantly seals off said pressure chamber and sustains axial load.

6. In a vehicle, an axle assembly, a vehicle frame assembly carried by said axle for relative movement, a pair of spring units spaced apart crosswise of said frame assembly and each having inner and outer members telescopically associated with one another and providing opposed spaced generated surfaces which converge, said inner members being rigidly mounted on one of said assemblies and said outer members being rigidly mounted on the other of said assemblies, an elastic ring both axially and radially compressed throughout its entire circumference between said opposed surfaces of each spring unit, strut means operatively associated with said axle assembly and having an elastic pivotal connection with said frame assembly, said rings being arranged and adapted to further radially compress on either lateral side and radially expand on the opposite lateral side responsive to respective lateral thrust on one of said assemblies relative to the other whereby resulting lateral relative movement is restricted by the rings while the latter at the same time are sustaining axial load.

7. In a vehicle, an axle assembly, a vehicle frame assembly carried by said axle assembly for vertical movements from a predetermined normal level with respect thereto, spring units each having inner and outer members telescopically associated with one another and providing opposed spaced generated surfaces which converge, said inner members being rigidly mounted on one of said assemblies and said outer members being rigidly mounted on the other of said assemblies, an elastic ring both radially and axially compressed throughout its entire circumference between said opposed surfaces of each spring unit and together with the inner and outer members of said unit defining a respective pressure chamber which tends to decrease in volume as the telescoping of such members is increased, a pair of laterally spaced struts extending generally lengthwise with respect to said frame assembly, said struts each being pivotally connected at one of its ends to said frame assembly by a common elastic journal and being operatively connected at its other end to said axle assembly, compressed fluid within said pressure chambers, and leveling means responsive to a displacement of said frame assembly from said normal level for supplying said pressure chambers with pressurized fluid under pressure greater than that in said chambers when said frame assembly is below said normal level and for venting said chambers when said frame assembly is above said normal level, said rings each being arranged and adapted to further radially compress on one lateral side and radially expand on the opposite lateral side responsive to respective lateral thrust on one of said assemblies relative to the other whereby the resulting relative lateral movement is restricted by the ring while the latter constantly seals off said pressure chamber and sustains axial load.

References Cited in the file of this patent

UNITED STATES PATENTS

| | | |
|---|---|---|
| 391,956 | Frager et al. | Oct. 30, 1888 |
| 1,020,209 | Liebau | Mar. 12, 1912 |
| 1,754,989 | Ericsson | Apr. 15, 1930 |
| 1,990,517 | Bedford et al. | Feb. 12, 1935 |
| 2,212,922 | Mercier | Aug. 27, 1940 |
| 2,412,885 | Harmon | Dec. 17, 1946 |
| 2,692,778 | Stump | Oct. 26, 1954 |
| 2,702,702 | Piragino | Feb. 22, 1955 |
| 2,743,939 | Reid et al. | May 1, 1956 |

FOREIGN PATENTS

| | | |
|---|---|---|
| 128,349 | Switzerland | Oct. 16, 1928 |
| 453,213 | Great Britain | June 8, 1935 |
| 1,078,210 | France | May 5, 1954 |
| 1,096,913 | France | Feb. 9, 1955 |